L. DUVALL.
Apparatus for Drying Poudrette.
No. 139,555.   Patented June 3, 1873.
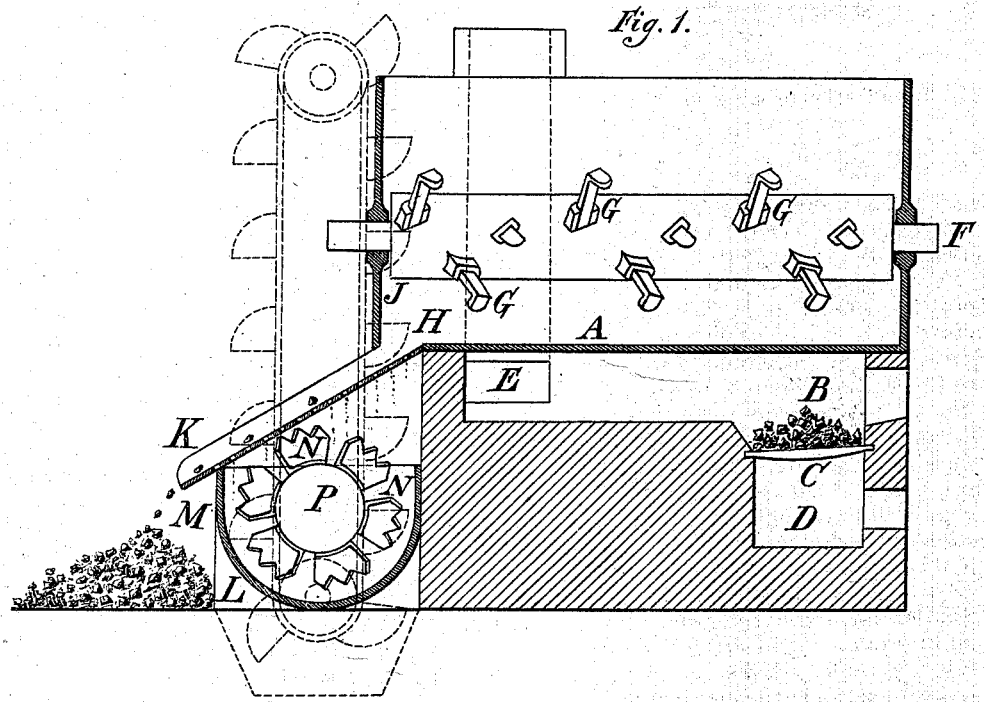
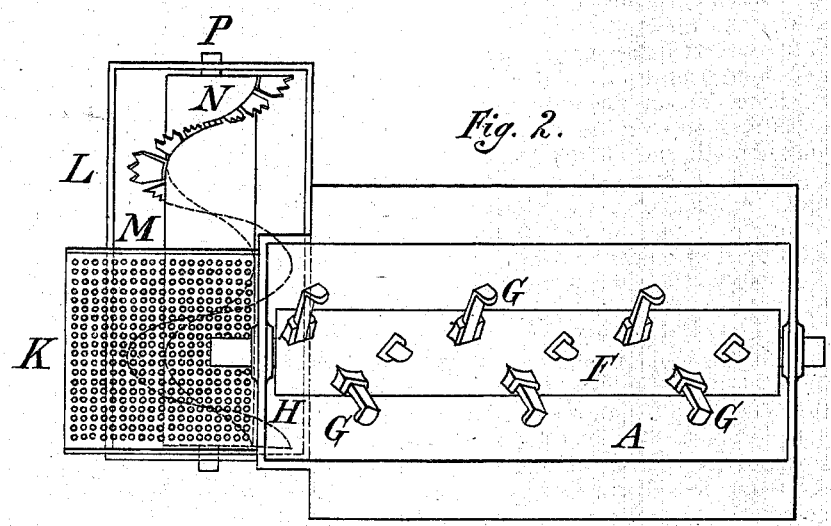
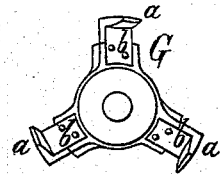
Witnesses:
Maillard F. Walton,
Robert H. Hox
Inventor:
Leonidas Duvall
by
Hui Wiedersheim &
Attys.

UNITED STATES PATENT OFFICE.

LEONIDAS DUVALL, OF PHILADELPHIA, PENNSYLVANIA, ASSIGNOR OF ONE-HALF HIS RIGHT TO ALFRED T. CLARK, OF SAME PLACE.

IMPROVEMENT IN APPARATUS FOR DRYING POUDRETTE.

Specification forming part of Letters Patent No. 139,555, dated June 3, 1873; application filed April 18, 1873.

*To all whom it may concern:*

Be it known that I, LEONIDAS DUVALL, of the city and county of Philadelphia and State of Pennsylvania, have invented a new and useful Improvement in Treating and Drying Poudrette; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a central vertical longitudinal section of the device embodying my invention. Fig. 2 is a top or plan view thereof. Fig. 3 is a view of a detached part.

Similar letters of reference indicate corresponding parts in the several figures.

My invention relates to an apparatus for treating excrementitious matter in such a manner as to fix and retain the ammonia and other valuable fertilizing agents in a condition to render them usefully available for manure. The invention consists, in part, in a heating-pan, containing a revolving shaft, armed with hook-shaped teeth, the whole adapted, as hereinafter described, to heat the matter while thoroughly mixing charcoal therewith, and deliver the whole in a dry state to a sifting apparatus or any suitable place of deposit. It also consists in the arrangement of a screen or sifting apparatus for distributing the heated matter conveyed from the drying-pan, whereby the poudrette proper drops into a breaking and grinding apparatus, while stones, bricks, and other foreign substances are discharged in a separate place. It also consists in means for thoroughly breaking and grinding the mass of poudrette and reducing it to powder, in which state it is conveyed to another point and subjected to a final screening operation.

Referring to the drawings, A represents a pan or trough, which is suspended over a fireplace, B, from suitable brick-work or walls of furnace or heating apparatus, of which C is the grate, D the ash-pit, and E the chimney. F represents a rotating shaft, which is arranged longitudinally within the pan A, and has its bearings in the end pieces of said pan, or in suitable hangers, or otherwise properly located. Secured to the surface of the shaft F is a series of beaters, G, which may be made removable and adjustable, and are adapted to sweep within the pan and reach the bottom thereof; and the beaters consist of hooked-shaped pieces, the hooks or outer ends *a* of which extend horizontally from the main lengths *b*, and are tapering on their inner faces. The beaters are arranged diagonally on the shaft F, and alternate with each other at such intervals that they may be said to be arranged spirally on the shaft. An opening, H, is made at one end, J, of the pan A, which end is outside of the brick-work or supporting-walls, and below the opening is mounted a diagonally-arranged screen or sieve, K, which is located over a breaking and grinding apparatus, L, which consists of a receiver, M, and toothed blade, N, mounted spirally on a rotating shaft, P, whose bearings are properly arranged and located.

The operation is as follows: Fire having been made in the furnace, power is applied to the shafts F P by means of suitable bands, belts, or other appliances, and the pan or trough A is filled with excrementitious matter. As the matter becomes heated the ammonia thereof would evaporate and thus pass off did I not avoid it. To this end I apply to the matter a proper quantity of charcoal, which absorbs the ammonia and retains it in the matter. As charcoal and ammonia are valuable as fertilizing agents, it is evident that this mode of treating the matter will produce a superior article of poudrette. The beaters G now agitate the mass in the pan A, and lift and drop it so that it is completely turned and subjected to the heat from below. The diagonal position of the beaters causes the drying and dried matter to be directed toward the opening H, and when it reaches the opening it is almost entirely dried. In this state it drops on the screen or sieve K and the particles of poudrette fall through, while pieces of bricks, stones, dishes, and articles usually dropped into privy-wells roll off of the screen and sieve and are deposited by themselves, as seen in Fig. 1. The poudrette is now lifted or shoveled and cut by the toothed blades from the moment of its entrance into and discharge from the receiver M, so that it is thoroughly broken and ground, and is in condition to be conveyed to another sieve or screen in order that the coarser and finer particles of the poudrette may be separated.

Having thus described my invention, what I claim as new, and desire to secure by Letters Patent, is—

1. The combination and arrangement of the heating-pan A, revolving shaft F, and hook-shaped teeth G, substantially as and for the purposes set forth.

2. The sieve or screen K, arranged in relation to the drying-pan A and the breaking and grinding apparatus L, substantially as and for the purpose set forth.

3. The toothed blades N and the receiver M, in connection with a heating apparatus, for the purpose stated.

4. The pan A, beaters G, sieve K, and breaking and grinding apparatus L, combined and operating substantially as and for the purpose stated.

The above signed by me this 21st day of March, 1873.

LEONIDAS DUVALL.

Witnesses:
JOHN A. WIEDERSHEIM,
MILLARD F. WALTON.